(12) United States Patent
Farag et al.

(10) Patent No.: US 6,833,825 B1
(45) Date of Patent: Dec. 21, 2004

(54) APPARATUS FOR REMOTELY CONTROLLING A DIGITAL PROCESSING SYSTEM

(75) Inventors: Abraham S. Farag, Palo Alto, CA (US); Harold James Welch, San Jose, CA (US); Bartley K. André, Menlo Park, CA (US); Jeffrey B. Doar, Fremont, CA (US); William H. Bull, Los Gatos, CA (US); Benjamin B. Lyon, Kensington, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/522,371

(22) Filed: Mar. 10, 2000

(51) Int. Cl.[7] ................................. G09G 5/08
(52) U.S. Cl. .................. 345/158; 345/156; 345/157; 345/159; 345/165; 345/166; 345/173; 358/28; 341/25; 341/31; 178/19.03; 379/93.19; 348/734; 200/510; 200/511
(58) Field of Search ................. 345/159, 156, 345/169, 173, 164, 165, 158, 160, 163, 157; 358/28; 341/25, 31; 178/19.03; 379/93.19; 348/734; 200/510, 511

(56) References Cited

U.S. PATENT DOCUMENTS

| | | | | |
|---|---|---|---|---|
| 5,313,229 A | * | 5/1994 | Gilligan et al. ............. | 345/157 |
| 5,483,530 A | * | 1/1996 | Davis et al. .................. | 370/79 |
| 5,528,259 A | * | 6/1996 | Bates et al. .................. | 345/676 |
| 5,581,621 A | * | 12/1996 | Koyama et al. ............ | 381/103 |
| 5,838,320 A | * | 11/1998 | Matthews III et al. ...... | 345/786 |
| 5,953,005 A | * | 9/1999 | Liu .............................. | 345/302 |
| 6,043,809 A | * | 3/2000 | Holehan ...................... | 345/168 |
| 6,166,721 A | * | 12/2000 | Kuroiwa et al. ............ | 345/163 |
| 6,262,724 B1 | * | 7/2001 | Crow et al. ................. | 345/328 |
| 6,271,824 B1 | * | 8/2001 | Chang ......................... | 345/123 |
| 6,292,654 B1 | * | 9/2001 | Hessel et al. ................ | 455/223 |
| 6,317,118 B1 | * | 11/2001 | Yoneno ....................... | 345/158 |
| 6,323,846 B1 | * | 11/2001 | Westerman et al. ......... | 345/173 |
| 6,340,966 B1 | * | 1/2002 | Wang et al. ................. | 345/163 |
| 6,414,671 B1 | * | 7/2002 | Gillespie et al. ............ | 345/157 |
| 6,587,093 B1 | * | 7/2003 | Shaw et al. ................. | 345/163 |

* cited by examiner

*Primary Examiner*—Xiao Wu
*Assistant Examiner*—Abbas Abdulselam
(74) *Attorney, Agent, or Firm*—Blakely, Sokoloff, Taylor & Zafman LLP

(57) ABSTRACT

According to one aspect of the invention an apparatus is provided for remotely controlling a digital processing system, comprising a housing, a scrolling detector, a cursor positioning detector, and a transmitter. The housing has a wall having an outer scrolling surface over which a finger of a person's hand is movable in a scrolling movement. The scrolling detector is located within the housing. The scrolling detector detects the scrolling movement remotely through the wall and generates a scrolling signal. The cursor positioning detector is secured to the housing and is actuable by the hand to generate a position signal. The transmitter transmits the scrolling signal and the position signal to the digital processing system.

15 Claims, 2 Drawing Sheets

APPARATUS FOR REMOTELY CONTROLLING A DIGITAL PROCESSING SYSTEM

BACKGROUND OF THE INVENTION

1). Field of the Invention

The present invention relates to an apparatus for remotely controlling a digital processing system.

2). Discussion of Related Art

Apparatus for remotely controlling a digital processing system usually includes a housing and a cursor positioning detector which is actuable by hand to generate the position signal when transmitted to the digital processing system. The digital processing system then utilizes the signal to control a cursor on a screen.

Once such an apparatus for controlling a digital processing system is in the form of a mouse wherein the housing has an upper surface which is shaped to be held within a cup of a person's hand. A ball is located in a base of the housing and rolls over a working surface when the housing is moved over the working surface. A detector then detects rotational movement of the ball and generates a position signal.

More recently, apparatuses have been developed which, in addition to generating a position signal, generate a scrolling signal. The scrolling signal is usually generated by rotating a wheel which protrudes from an upper surface of a housing. A detector then detects rotational movement of the wheel and generates a scrolling signal which is transmitted to a digital processing system. A wheel has moving parts which can break. The wheel requires several parts which, once assembled, allow dirt and water to enter into the housing.

Another device may utilize a resistor pad which is mounted within an upper surface of a housing. Although the housing may have a concave, curved surface, the resistive pad would be flat. There would thus be a discontinuity in curvature from an upper surface of the housing to the pad. Such a discontinuity is ergonomically less desirable than a continuous curvature.

SUMMARY OF THE INVENTION

According to one aspect of the invention an apparatus is provided for remotely controlling a digital processing system, comprising a housing, a scrolling detector, a cursor positioning detector, and a transmitter. The housing has a wall having an outer scrolling surface over which a finger of a person's hand is movable in a scrolling movement. The scrolling detector is located within the housing. The scrolling detector detects the scrolling movement remotely through the wall and generates a scrolling signal. The cursor positioning detector is secured to the housing and is actuable by the hand to generate a position signal. The transmitter transmits the scrolling signal and the position signal to the digital processing system.

BRIEF DESCRIPTION OF THE DRAWINGS

The invention is further described by way of example with reference to the accompanying drawings wherein like reference numerals indicate like or similar components and.

DETAILED DESCRIPTION OF THE INVENTION

Figure 1:
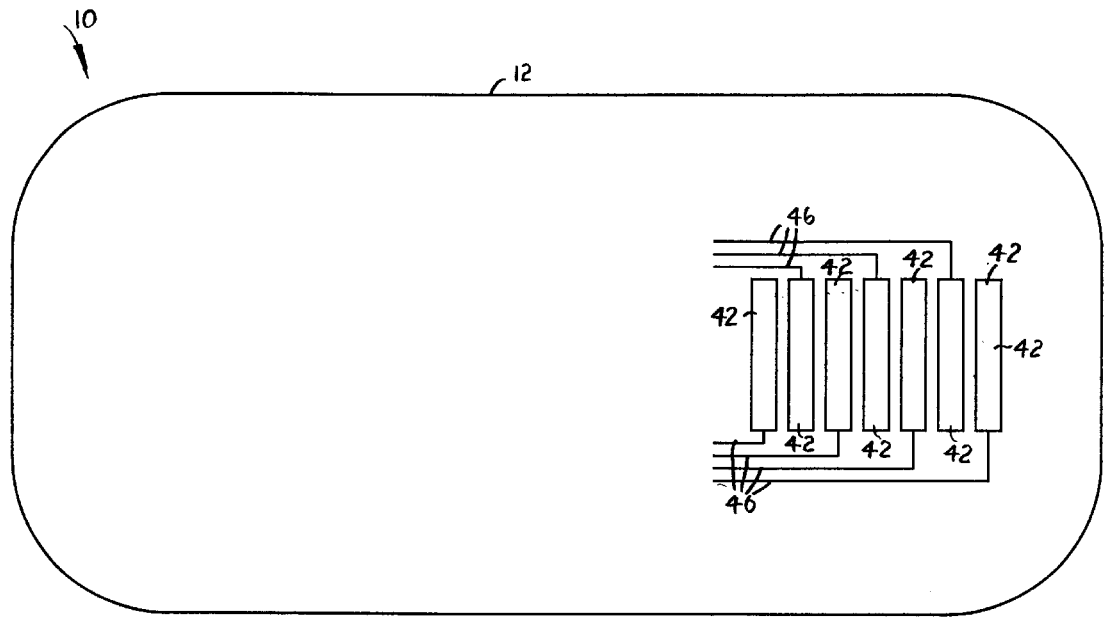
FIG. 1 is a top plan view of apparatus, according to one embodiment of the invention, for controlling a digital processing system, illustrating internal components.
Figure 2:
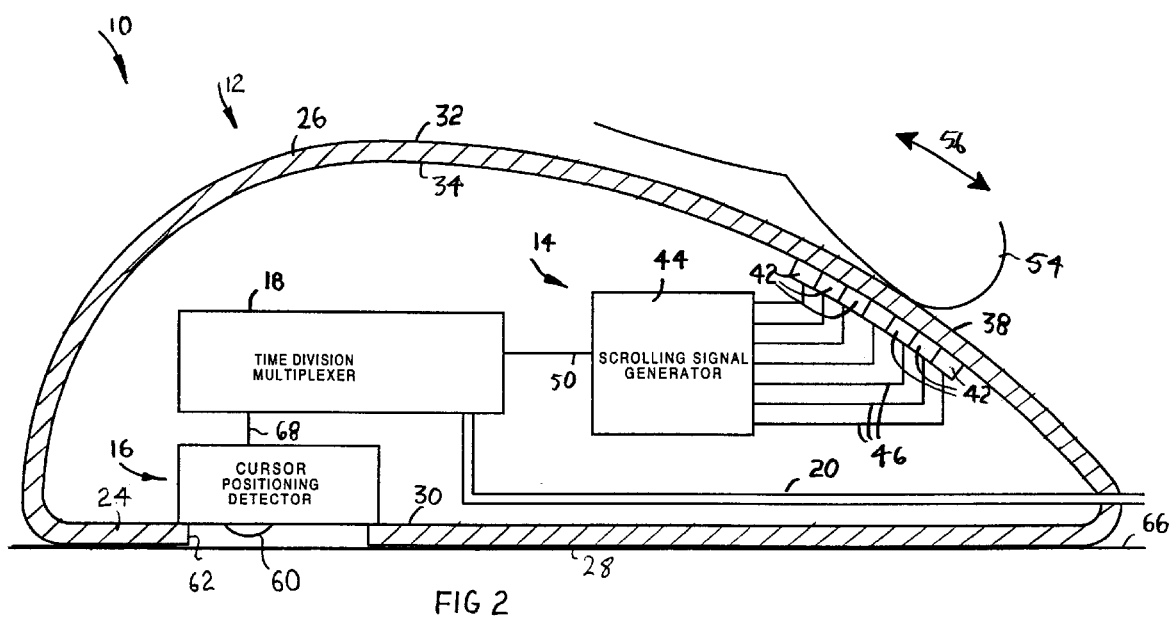
FIG. 2 is a cross-sectional side view of the apparatus of FIG. 1.

FIG. 1 and FIG. 2 of the accompanying drawings illustrate an apparatus 10 for controlling a digital processing system according to an embodiment of the invention. The apparatus 10 includes a housing 12, a scrolling detector 14, a cursor positioning detector 16, a time division multiplexer 18, and a cable transmitter 20.

The housing 12 includes a base 24 and an upper wall 26. The base 24 has a lower surface 28 which is substantially flat and an upper surface 30. The upper wall 26 has an upper, outer surface 32, and a lower, inner surface 34. Inner confines of the housing 12 are defined by the upper surface 30 of the base 24 and the lower surface 34 of the upper wall 26.

The upper surface 32 of the upper wall 26 has a convex shape which is ergonomically dimensioned to fit within a cup of a person's hand. The wall may be between 0.5 mm and 3 mm thick. A front portion of the upper surface 32 forms a scrolling surface 38. The upper surface 32 has a continuous curvature so that there is no step between the scrolling surface 38 and any other area of the upper surface 32. The scrolling surface 38 follows the same convex, curved surface of the upper surface 32.

The scrolling detector 14 is located within the housing 12 and includes a plurality of capacitor terminals 42 and a scrolling signal generator 44.

The capacitor terminals 42 are in the form of elongate strips which are attached next to one another against the lower surface 34 of the upper wall 26. The capacitor terminals 42 are located on an area of the lower surface 34 of the upper wall 26 directly opposing the scrolling surface 38. The upper wall 26 is uniformly thick so that the capacitor terminals 42 are thus equidistantly spaced from the scrolling surface 38 and located against a concave portion of the lower surface 34. Each capacitor terminal 42 is connected by a respective capacitor sensor line 46 to the scrolling signal generator 44. The scrolling signal generator 44 thus receives an input from each capacitor terminal 42 which is indicative of a change in capacitance measured by the respective capacitor terminal 42.

In use, a person locates a hand over the upper surface 32 of the upper wall 26. A forefinger of the hand can then be located against the scrolling surface 38 and moved back and forth in a direction 56 over the scrolling surface 38.

An electric field is generated between and around adjacent ones of the capacitor terminals 42. The electric field is partially located within the upper wall 26 and partially located outside the housing 12 in the region of the scrolling surface 38. Movement of the finger 54 over the scrolling surface 38 causes a disturbance in the electric field. The disturbance in the electric field results in a change of capacitance between adjacent ones of the capacitor terminals 42. The change in capacitance is most between adjacent ones of the capacitor terminals 42 located nearest the finger 54. The change in capacitance of one of the capacitor terminals 42 results in a change in voltage on the capacitor sensor line 46. The change in voltage is most in the capacitor sensor line 46 which is connected to one of the capacitor terminals 42 located closest to the finger 54. The scrolling signal generator 44 thus receives capacitance change signals via the capacitor sensor lines 46 which indicate where the finger 54 is located on the scrolling surface 38.

The scrolling signal generator 44 then generates a scrolling signal which is transmitted through the output line 50 and is indicative of which one of the voltages is most effected in the capacitor sensor lines 46. The scrolling signal may, for example, be a voltage which is high when the finger 54 is near an upper one of the capacitor terminals 42 and which is low when the finger 54 is near a lower one of the capacitor terminals 42. One skilled in the art would appreciate that other embodiments are also possible, such as generating a digital scrolling signal having an numerical value which indicates where the finger 54 is located or by outputting a quadrature signal of movement of the finger 54 instead of position.

One can thus see that the capacitors 42 detect the position of the finger 54 on the scrolling surface 38 remotely through the upper wall 26. By so detecting the position of the finger 54, it is possible to form the upper surface 32 and the scrolling surface 38 in a more ergonomically friendly manner. In particular, it is possible to form the upper surface 38 so as to have a uniform curvature and without a step or a transition between the scrolling surface 38 and any other area of the upper surface 32. Although the scrolling surface 38 is curved, the capacitor terminals 42 are still equidistantly spaced from the scrolling surface 38, thus ensuring an electronic field which is sufficiently uniform to ensure reliable operation. Another embodiment may utilize capacitor terminals that are in a plane varying in distance from a scrolling surface but may vary in size to that a substantially uniform electric field is created.

The cursor positioning detector 16 includes a camera 60 and is secured over an opening 62 and the base 24 so that the camera 60 has a lens pointing out of the housing 12. A person can hold onto the upper surface 32 of the upper wall 26 and, while the finger 54 is located on the scrolling surface 38, move the housing 12 so that the lower surface 28 of the base 24 slides over a working surface 66. The cursor positioning detector 16 continually takes pictures of the working surface 66. The pictures are compared to one another so that the change in X-and Y-coordinates of the camera 60 over the surface 66 can be determined. The cursor positioning detector 16 then generates a position signal which is transmitted over an output line 68 to the time division multiplexer 18. The position signal includes information of the change in coordinates of the camera 60 over the working surface 66. Devices such as the cursor positioning detector 16 are known in the art. In another embodiment the cursor positioning which can roll over a working surface. A detector may be provided for detecting rolling motion of the ball. Other cursor positioning detectors may also occur to one of ordinary skill in the art.

The cable transmitter 20 is connected to the time division multiplexer 18 and extends from the time division multiplexer 18 out of the housing 12 close to a location near the scrolling surface 38. An end of the cable transmitter 20 can be connected to a digital processing system so that a signal transmitted by the time division multiplexer 18 is received by the digital processing system. The time division multiplexer 18 receives the scrolling signal through the output line 50 and the position signal through the output line 68. The time division multiplexer 18 alternately transmits the scrolling signal and the position signal through the cable transmitter 20 to the digital processing system. The scrolling signal and the position signal are used by the digital processing system to control a cursor on a screen. Time division multiplexers of this kind are know in the art. Since both the scrolling signal and the position signal are transmitted over the cable transmitter 20, a single cable can be used for the cable transmitter 20. In another embodiment, the cable transmitter 20 may include two cables, one for transmitting a scrolling signal and one for transmitting a position signal. Another embodiment may utilize an infrared, optical or other wireless transmitter.

Figure 3:
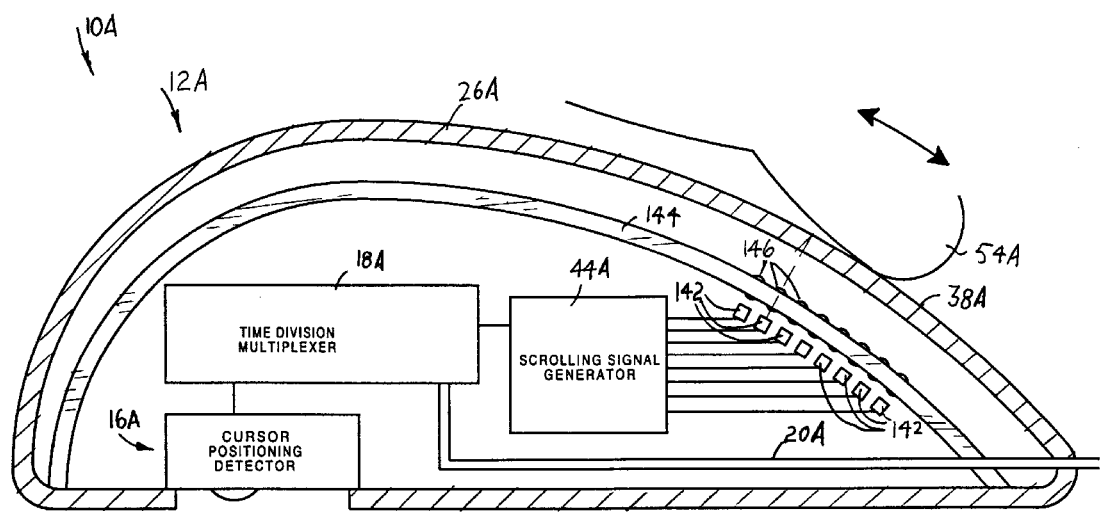
FIG. 3 is a cross-sectional side view of apparatus, according to another embodiment of the invention, for controlling a digital processing system.

FIG. 3 illustrates apparatus 10A according to an alternative embodiment of the invention for controlling a digital processing system. As with the embodiment of FIG. 1 and FIG. 2, the apparatus 10A includes a housing 12A, a scrolling signal generator 44A, a time division multiplexer 18A, and a cursor positioning detector 16A. The housing 12A is made of a transparent material or at least a material which is transmissive to infrared radiation. A plurality of infrared emitter-detectors 142 are located within the housing 12A. A lens housing 144 having a plurality of lenses 146 thereon is also located within the housing 12A between an upper wall 26A of the housing 12A and the infrared emitter-detectors 142. The lens housing 144 is also made of a transparent material or a material that is transmissive to infrared radiation.

The emitter-detectors emit infrared radiation to a scrolling surface 38A. The infrared radiation varies over time in amplitude to eliminate the effect of stray infrared radiation. Such practice is know in the art.

A finger 54A contacting the scrolling surface 38A transmits infrared light back through the upper wall 26A into the housing 12A. The infrared radiation is focused by one of the lenses 146A and transmits through the lens housing 144A onto one of the infrared emitter-detectors 142. The infrared emitter-detectors 142 can thus detect the location of the finger 54A remotely through the lens housing 144 and the upper wall 26A.

Each infrared emitter-detector 142 is connected to the scrolling signal generator 44A so that the scrolling signal generator 44A receives information which is indicative of where the finger 54A contacts or is located over the scrolling surface 38A. The scrolling signal generator 44A generates a scrolling signal which includes information of where the finger 54A is located over the scrolling surface 38A, and transmits the scrolling signal to the time division multiplexer. Further details of the embodiment of FIG. 3, including the use of the cursor positioning detector 16A and a cable transmitter 20, are similar to the embodiment of FIG. 1 and FIG. 2.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. An apparatus for remotely controlling a digital processing system, comprising:

a housing having a wall with an outer scrolling surface over which a finger of a person's hand is movable in a scrolling movement, wherein the finger is moved back and forth over the scrolling surface;

a scrolling detector located within the housing, detecting the scrolling movement remotely through the wall, and generating a scrolling signal, wherein the scrolling detector includes a plurality of capacitor terminals adjacent one another and within the housing, and disposed along an arc such that the capacitor terminals are equidistantly spaced from the outer scrolling surface, the capacitor terminals detecting a change in capacitance as the finger moves in the scrolling movement;

a cursor positioning detector secured to the housing, being actuable by the hand to generate a position signal; and a transmitter which transmits the scrolling signal and the position signal to the digital processing system.

2. The apparatus of claim 1 wherein the scrolling detector detects the scrolling movement by detecting a change in capacitance.

3. The apparatus of claim 2 wherein a capacitance between adjacent ones of the capacitor terminals changes when the finger moves in the scrolling movement.

4. The apparatus of claim 1 wherein the scrolling surface is curved.

5. The apparatus of claim 1 wherein the scrolling detector includes a scrolling signal generator which is coupled to the capacitor terminal to receive a capacitance change signal indicative of a change in capacitance measured by each capacitor terminal, the scrolling signal generator utilizing the capacitance change signals to generate the scrolling signal which is indicative of the scrolling movement.

6. The apparatus of claim 1 wherein the housing has an outer holding surface which is shaped to be held within a cup of the hand.

7. The apparatus of claim 6 wherein movement of the housing over a working surface causes the cursor positioning detector to generate the position signal.

8. The apparatus of claim 6 wherein the outer holding surface and the outer scrolling surface have a continuous curvature.

9. The apparatus of claim 1 further comprising a multiplexer which receives the scrolling signal and the position signal and utilizes the scrolling signal and position signal to generate at least one digital processing signal which is transmitted by the transmitter to the digital processing system.

10. The apparatus of claim 9 wherein the multiplexer is a time division multiplexer.

11. The apparatus of claim 1 wherein the transmitter is a cable extending out of the housing.

12. The apparatus of claim 1 wherein the wall is optically transmissive and the detector includes at least one optical detector located within the housing and detecting the scrolling movement through the wall.

13. The apparatus of claim 12 wherein the wall is transmissive to infrared radiation and the optical detector is an infrared detector.

14. Apparatus for remotely controlling a digital processing system, comprising:

a housing for positioning on a working surface, the housing having an outer holding surface which is shaped to be held within a cup of a hand, at least part of the housing being a wall having an outer scrolling surface over which a finger of the hand is movable in a scrolling movement, wherein the finger is moved back and forth over the scrolling surface;

a scrolling detector located within the housing, the scrolling detector detecting the scrolling movement of the finger remotely through the wall, and generating a scrolling signal which includes information indicative of the scrolling movement, wherein the scrolling detector includes a plurality of capacitor terminals located adjacent one another within the housing, and disposed along an arc such that the capacitor terminals are equidistantly spaced from the outer scrolling surface, the capacitor terminals detecting a change in capacitance as the finger moves in the scrolling movement;

a cursor positioning detector secured to the housing, the housing being movable by the hand over the working surface, the cursor positioning detector detecting cursor positioning movement of the housing over the working surface and generating a position signal which includes information indicative of the cursor positioning movement; and a transmitter which transmits the scrolling signal and the position signal to the digital processing system.

15. A method of remotely controlling a digital processing system, comprising:

scrolling a finger in a scrolling movement, wherein the finger is moved back and forth over a scrolling surface of a wall of a housing, the scrolling movement being detected by a scrolling detector remotely through the wall, the scrolling detector generating a scrolling signal which is transmitted to the digital processing system, wherein the scrolling detector includes a plurality of capacitor terminals located adjacent one another, and disposed along an arc such that the capacitor terminals are equidistantly spaced from the scrolling surface, the capacitor terminals detecting a change in capacitance as the finger moves in the scrolling movement; and actuating a cursor positioning controller, secured to the housing, with the hand, the cursor positioning controller generating a position signal which is transmitted to the digital processing system.

* * * * *